Dec. 22, 1970 J. D. ROSS ETAL 3,550,087

VIDEO SWITCHING CIRCUIT

Filed March 26, 1968

INVENTORS
JOHN D. ROSS
KIMIHARU AKIYAMA

BY Addams & Ferguson
ATTORNEYS

United States Patent Office 3,550,087

Patented Dec. 22, 1970

3,550,087

VIDEO SWITCHING CIRCUIT

John D. Ross, Dollard des Ormeaux, Quebec, and Kimiharu Akiyama, Dorval, Quebec, Canada, assignors to Central Dynamics, Ltd., Montreal, Quebec, Canada, a body corporate Filed Mar. 26, 1968, Ser. No. 716,117
Int. Cl. H03k *3/26, 17/84;* H04q
U.S. Cl. 340—166 23 Claims

ABSTRACT OF THE DISCLOSURE

A switching matrix is disclosed where at each crosspoint of the matrix is disposed a video switching circuit which includes a differential amplifier. The amplifier forms some or all of an integrated circuit, the input video signal to each crosspoint switching circuit being applied to one of the transistors comprising the differential amplifier. A constant current source is provided for the differential amplifier, the current source including a transistor which is switched on and off by an external control signal whenever the input video signal is to be passed or blocked by the crosspoint circuit. A feedback connection (including one of the differential amplifier transistors and a further transistor in complementary connection with the differential amplifier transistor) forms a high gain, non-inverting amplifier which provides a high input impedance and a low output impedance for the switching circuit. The use of the integrated circuit differential amplifier results in essentially zero offset between the input and output terminals of each crosspoint switching circuit.

BACKGROUND OF THE INVENTION

This invention relates to crosspoint switching circuitry and to switching matrices incorporating such circuitry for use as television broadcasting stations and the like. At such stations there is typically a need for connecting at least one of a plurality of input video signals to at least one of a plurality of output terminals. To accomplish this, a matrix of switches or crosspoints is used where each crosspoint corresponds to a particular pair of input and output terminals.

PRIOR ART

One of the better approaches for dealing with the problems which occur in the switching matrices mentioned above is described in detail in United States Patent 3,290,519 granted Dec. 6, 1966, to John D. Ross and assigned to Central Dynamics, Ltd., Pointe Claire, Canada. This approach has many important advantages and is quite useful in many applications; however, the attainment of a zero offset voltage between the input and output terminals at all of the crosspoint switching circuits is difficult to obtain because of the necessity of matching the components used in the crosspoint circuits.

SUMMARY OF THE INVENTION

Thus, it is a primary object of the invention to provide an improved video switching circuit having essentially zero offset voltage between the input and output terminals thereof.

It is a further object of this invention to provide an improved circuit of the above type wherein a frequency response of $\pm 0.01$ db from DC to 10 mHz. is obtained.

It is a further object of this invention to substantially reduce high frequency crosstalk to the output.

Other objects and advantages of this invention will become apparent upon reading the appended claims in conjunction with the following detailed description and the attached drawings.

DETAILED DESCRIPTION OF A PREFERRED EMBODIMENT OF THE INVENTION

Figure 1:
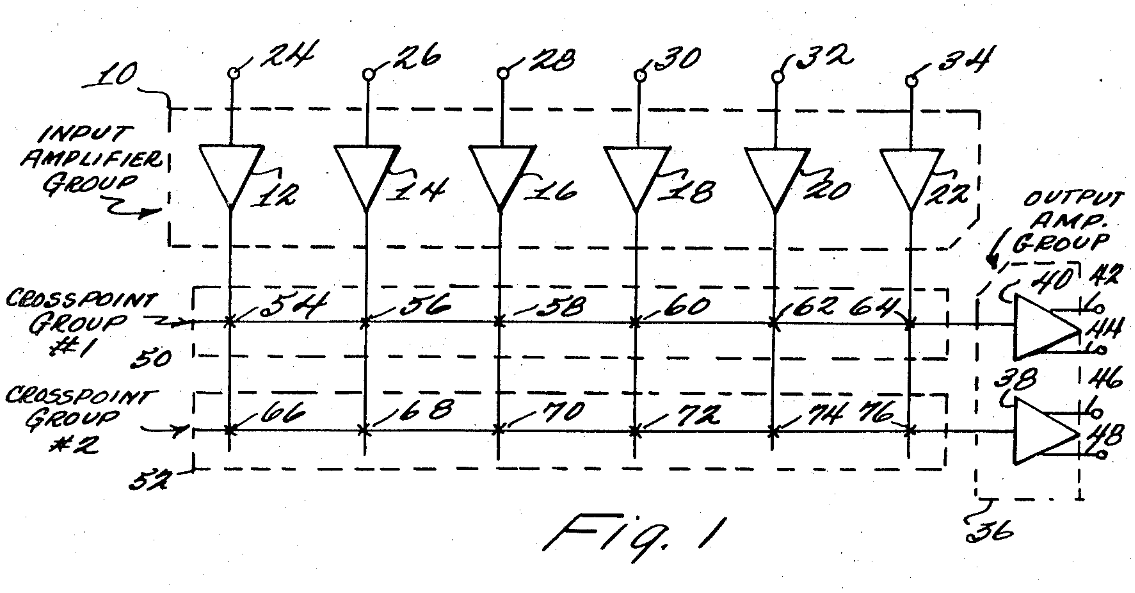
FIG. 1 is a diagrammatic representation of a video switching matrix comprising a plurality of crosspoint switching circuits.

Referring to FIG. 1, there is shown an illustrative embodiment of a diagrammatic representation of a switching matrix for video signals of the type which typically occur at television transmitting stations. Although the invention will be described in terms of video signals typically employed in television applications it is to be understood that the principles of the invention are also applicable to signals of other frequencies.

In FIG. 1 there is shown a group 10 of input amplifiers comprising amplifiers 12 through 22 which, in turn, are respectively connected to input terminals 24 through 34. At each of these input terminals may occur a video signal. A group 36 of output amplifiers 36 comprises amplifiers 38 and 40, each of which may have at least a pair of output terminals, these terminals being indicated as 42 through 48. In order to connect any one of the video signals occurring at input terminals 24 through 34 to any one of the output amplifiers 38 and 48, a plurality of crosspoint groups 50 and 52 are provided, crosspoint group 50 comprising crosspoints 54 through 64 and crosspoint group 52 comprising crosspoints 66 through 76. Thus, the crosspoints 54 through 76 comprise a matrix of such points where at each of the points is located a switching circuit which operates under a control signal external to the circuitry of FIG. 1. Thus, if input terminal 28 were to be connected to output amplifier 38 a control signal would be applied to the switching circuit at crosspoint 70. Although a particular number of amplifiers are illustrated in both the input and output groups of FIG. 1, it is to be understood that any number may be employed in either group depending on the particular application.

Figure 2:
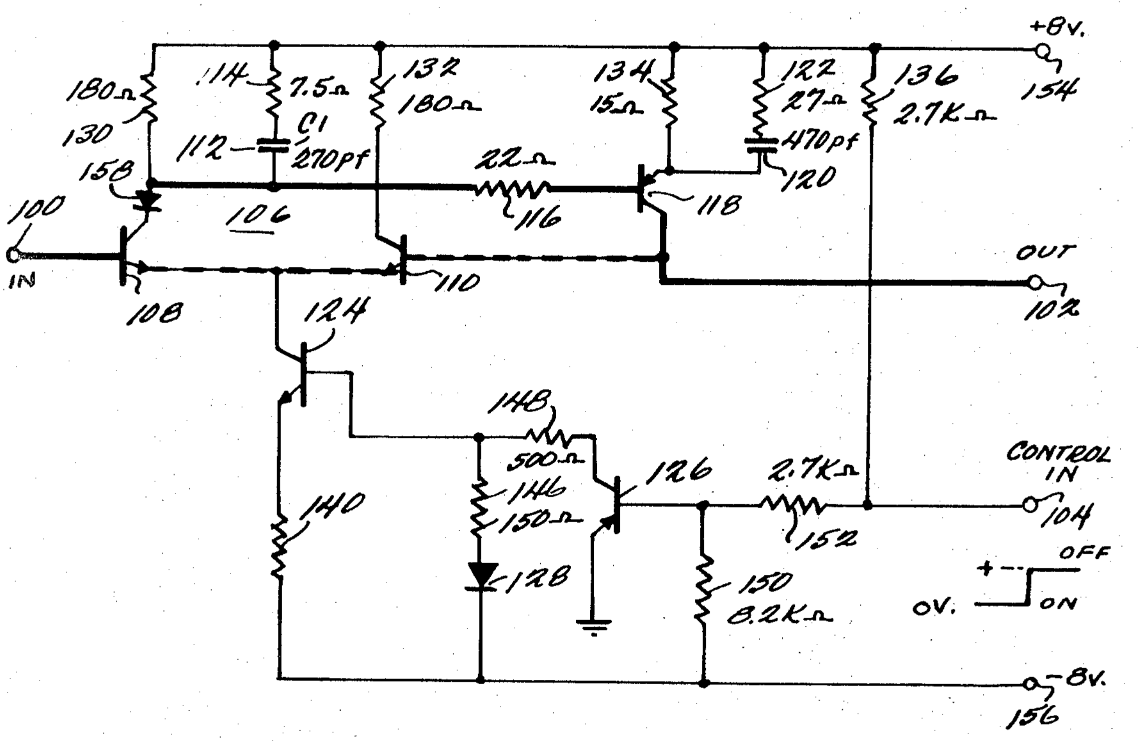
FIG. 2 is a schematic diagram of an illustrative embodiment of a video switching circuit located at any one of the crosspoints of FIG. 1.

Reference should now be made to FIG. 2 which is a schematic diagram of an illustrative embodiment of a switching circuit which may be disposed at any one of the crosspoints 54 through 74 of FIG. 1. The input terminal 100 is connected to the output of any one of the input amplifiers 12 through 22 of FIG. 1. The output terminal 102 is connected to the input to any one of the output amplifiers 38 and 40 of FIG. 1. A control terminal 104 is provided for the reception of a control signal which respectively turns the switching circuit of FIG. 2 either ON or OFF depending on the level of the control signal. Indicated adjacent control terminal 104 is a waveform illustrating the ON and OFF levels of the control signal. Thus, the level corresponding to the ON state of the switch is typically zero volt while the level corresponding to the OFF state is some voltage which is positive with respect to zero volt. The path of the video signal through the switch is indicated by the heavy line connecting terminals 100 and 102. A feedback path within the switch which causes high input and low output impedances is indicated by the heavy dotted line. The input terminal 100 is connected to a differential amplifier generally indicated at 106, the amplifier including NPN transistor or first control element 108 and NPN transistor or second control element 110, the transistor having a common emitter connection. This differential amplifier is preferably produced in accordance with integrated circuit techniques and typically the amplifier will form a portion of a larger integrated circuit. Because an integrated circuit is used, the transistors 108 and 110 will be inherently matched and thus zero offset voltage is assured between the input and output terminals 100 and 102. A substantial reduction in production time thus results when the present invention is compared with prior art approaches. Thus, a non-zero offset voltage typically occurs at each of the crosspoints of the switching matrices of the prior art thereby necessitating matching of all components to be used in each of the switching circuits so that the offset voltages for all crosspoint switches would be equal. It can be readily appreciated that this results in a substantial consumption of production time. As stated above, this problem is inherently overcome by the use of an integrated differential amplifier circuit.

A phase shifting network comprising capacitors 112 and resistors 114 and 116 stabilize a negative feedback amplifier which includes PNP transistor or third control element 118 and NPN transistor 110. The complementary connection of these transistors forms a high gain, noninverting amplifier and heavy negative feedback is applied via transistor 110 to thereby provide high input and low output impedances for the switch of FIG. 2. Capacitor 120 and resistor 122 also provide frequency compensation to flatten the frequency response curve. The presence of capacitors 112 and 120 further substantially improves the frequency response of the switching circuit as compared to prior art circuitry. In fact, a frequency response of ±0.01 db for DC to 10 mHz. has been achieved on an experimental basis.

NPN transistor or fourth control element 124 acts as a constant current source for transistors 108 and 110. Further, this transistor controls the status of the crosspoint switching circuit. PNP transistor 126 acts as a coupling means between the control terminal 104 and the transistor 124. Diode 128 compensates for drift in the base-emitter voltage of transistor 124 to insure constant collector current. Resistors 130 through 152 act as sources of biasing voltages from the terminals 154 and 156 for various points throughout the circuits. In FIG. 2 illustrative values of many of the components are given, these values are not to be taken as limitative but only as illustrative of values employed in a typical working embodiment of the invention.

Diode 158 serves several important functions. Thus, when the crosspoint switching circuit is in its OFF condition, thihs diode becomes reverse biased to thereby further aid in the reduction of high frequency crosstalk from the input terminal 100 to the output terminal 102. Also this diode aids in the reduction of the input capacitance variation of the switching circuit of FIG. 2 between the ON and OFF states.

In operation, when the switch is turned ON, the control signal applied to terminal 104 will assume a level of typically zero volt which turns transistor 126 ON and causes a base current of typically approximately 1 milliamp to flow, which in turn is sufficient to saturate transistor 124. With transistor 124 activated, a video signal present at terminal 100 will travel along the heavy line to output terminal 102.

When the control signal applied to terminal 104 goes positive, transistor 126 is turned OFF and at the same time transistor 124 is turned OFF thereby effectively turning OFF the crosspoint switching circuit of FIG. 2.

Numerous modifications of the invention will become apparent to one of ordinary skill in the art upon reading the foregoing disclosure. During such a reading it will be evident that this invention provides unique switching circuitry for accomplishing the objects and advantages herein stated. Still other objects and advantages and even further modifications will become apparent from this disclosure. It is to be understood, however, that the foregoing disclosure is to be considered exemplary and not limitative, the scope of the invention being defined by the following claims.

What is claimed is:

1. A switching circuit including:

an integrated differential amplifier circuit having first and second control elements, said first control element being connected to the input terminal for said switching circuit;

a third control element for coupling the output signal from said first control element to the output terminal for said switching circuit;

a feedback connection between said second and third control elements to thereby provide high input and low output impedances for said switching circuit;

a fourth control element for providing constant current to said differential amplifier which divides between said first and second control elements; and a control signal source for turning said fourth control element ON and OFF to thereby respectively turn said switching circuitry ON and OFF.

2. A switching circuit as in claim 1 where said first and second control elements are transistors of the same polarity having common terminals connected together, said fourth control element being connected to said common terminals.

3. A switching circuit as in claim 2 where said third control element is a transistor of polarity opposite to that of said second control element.

4. A switching circuit as in claim 3 including capacitive means connected to said first and third control elements for broadening the frequency response of said switching circuit.

5. A switching circuit as in claim 4 including rectifying means disposed between said first and third control elements for minimizing crosstalk between the input and output elements of said switching circuit.

6. A switching circuit as in claim 5 including rectifying means connected to said fourth control element for maintaining the current produced thereby substantially constant.

7. A switching circuit as in claim 1 where said first and second control elements are NPN transistors, their emitters being connected together and the input signal to said switching circuit being connected to the base of the first transistor.

8. A switching circuit as in claim 7 where said third control element is a PNP transistor having its base connected to the collector of said first control element and its emitter connected to the base of said second control element and to the said output terminal for the switching circuit.

9. A switching circuit as in claim 8 where said fourth control element is an NPN transistor having its collector connected to the emitters of said first and second control elements and its base connected to said control signal source.

10. A switching circuit as in claim 9 including a plurality of capacitive means respectively connected to the collector of said first control means and the emitter of said third control means for broadening the frequency response of said switching circuit.

11. A switching circuit as in claim 10 including a diode connected between the collector of said first control means and the base of said third control means for minimizing high frequency crosstalk between the input and output terminals of said switching circuit, the cathode of said diode being connected to the collector of said first control means and the anode being connected to the base of said third control means.

12. A switching circuit as in claim 11 including a diode connected to the base of said fourth control means for maintaining the current produced thereby substantially constant.

13. A switching circuit as in claim 1 where said input signal is a television video signal.

14. A switching matrix comprising:

a plurality of input terminals;

a plurality of output terminals;

a matrix of crosspoints connecting all of said input terminals to all of said output terminals; and a plurality of switching circuits respectively disposed at said plurality of crosspoints where each switching circuit includes an input terminal connected to one of said plurality of input terminals and an output terminal connected to one of said plurality of output terminals, each said switching circuit including:

an integrated differential amplifier circuit having first and second control elements, said first control element being connected to the input terminal for said switching circuit;

a third control element for coupling the output signal from said first control element to the output terminal for said switching circuit;

a feedback connection between said second and third control elements to thereby provide high input and low output impedances for said switching circuit; and a fourth control element for providing constant current to said differential amplifier which divides between said first and second control elements; and a control signal source for turning said fourth control element ON and OFF to thereby respectively turn said switching circuitry ON and OFF.

15. A switching matrix as in claim 14 where said first and second control elements are transistors of the same polarity having common terminals connected together, said fourth control element being connected to said common terminals.

16. A matrix as in claim 15 where said third control element is a transistor of polarity opposite to that of said second control element.

17. A matrix as in claim 15 where said first and second control elements are NPN transistors, their emitters being connected together and the input signal to said switching circuit being connected to the base of the first transistor.

18. A matrix as in claim 17 where said third control element is a PNP transistor having its base connected to the collector of said first control element and its emitter connected to the base of said second control element and to the said output terminal for the switching circuit.

19. A matrix as in claim 18 where said fourth control element is an NPN transistor having its collector connected to the emitters of said first and second control elements and its base connected to said control signal source.

20. A matrix as in claim 19 including a plurality of capacitive means respectively connected to the collector of said first control means and the emitter of said third control means for broadening the frequency response of said switching circuit.

21. A matrix as in claim 20 including a diode connected between the collector of said first control means and the base of said third control means for minimizing high frequency crosstalk between the input and output terminals of said switching circuit, the cathode of said diode being connected to the collector of said first control means and the anode being connected to the base of said third control means.

22. A matrix as in claim 21 including a diode connected to the base of said fourth control means for maintaining the current produced thereby substantially constant.

23. A matrix as in claim 14 where the input signals respectively applied to said plurality of input terminals are television video signals.

References Cited

UNITED STATES PATENTS

| | | | |
|---|---|---|---|
| 3,378,780 | 4/1968 | Lin | 330—28X |
| 3,416,092 | 12/1968 | Frederiksen | 330—69X |
| 3,469,112 | 9/1969 | Hands et al. | 330—69X |
| 3,482,177 | 12/1969 | Sylvan | 330—69X |

DONALD J. YUSKO, Primary Examiner

U.S. Cl. X.R.

307—241, 303; 330—69